United States Patent
Chopping et al.

(10) Patent No.: US 7,388,863 B2
(45) Date of Patent: Jun. 17, 2008

(54) PORT LABEL SWITCHING

(75) Inventors: Geoffrey Chopping, Wimborne (GB); Thomas Slade Maddern, Wimborne (GB)

(73) Assignee: Ericsson Ab, Stockholm (SE)

( * ) Notice: Subject to any disclaimer, the term of this patent is extended or adjusted under 35 U.S.C. 154(b) by 625 days.

(21) Appl. No.: 10/504,385

(22) PCT Filed: Feb. 11, 2003

(86) PCT No.: PCT/GB03/00560

§ 371 (c)(1), (2), (4) Date: Mar. 24, 2005

(87) PCT Pub. No.: WO03/069854

PCT Pub. Date: Aug. 21, 2003

(65) Prior Publication Data

US 2005/0169236 A1    Aug. 4, 2005

(30) Foreign Application Priority Data

Feb. 14, 2002   (GB) .................................. 0203470.0

(51) Int. Cl.
*H04L 12/28* (2006.01)

(52) U.S. Cl. .................... 370/389; 370/395.1; 370/397; 370/399; 709/236

(58) Field of Classification Search ................ 370/389, 370/395.1, 397, 399; 709/236
See application file for complete search history.

(56) References Cited

U.S. PATENT DOCUMENTS

2001/0024438 A1   9/2001  Sugiyama et al.
2002/0009050 A1   1/2002  Ueno
2002/0083190 A1*  6/2002  Kamiya et al. ............. 709/236

FOREIGN PATENT DOCUMENTS

EP    1 168 728 A2    1/2002

OTHER PUBLICATIONS

Rosen, E.C., et al., *Multiprotocol Label Switching Architecture*, IETF, <URL:hhtp://www.inf.puc-rio.br/{thyago/refer/tweg/draft-ietf-mpls-arch-06.txt> Aug. 1999, pp. 27 & 31.

* cited by examiner

*Primary Examiner*—Hassan Kizou
*Assistant Examiner*—Jeffrey M Rutkowski
(74) *Attorney, Agent, or Firm*—Kirschstein, et al.

(57) ABSTRACT

A communications switch comprising a plurality of numerically identified input traffic ports, a plurality of numerically identified output traffic ports, at least one significant label extractor and at least one numerical processor, the communications switch being arranged whereby each message entering the communication switch by a numerically identified input traffic port contains a header, which header contains a label stack, which label stack includes at least one valid label, of which one valid label is a significant label. The numerical value of the significant label contained within the header of a particular message which entered the communications switch via a particular numerically identified input traffic port is extracted by the at least one significant label extractor and is supplied to one of the at least one numerical processors. The numerical processor uses the significant label of the particular message and the numerical value of the particular numerically identified input traffic port to form a numerical result which directly equates to the number of the numerically identified output traffic port by which the particular message leaves the communications switch and wherein the numerical result is equal to the modulo addition of the numerical value of the significant label and the numerical value of the particular numerically identified input traffic port.

15 Claims, 18 Drawing Sheets

1 SWITCH TO TRAVERSE

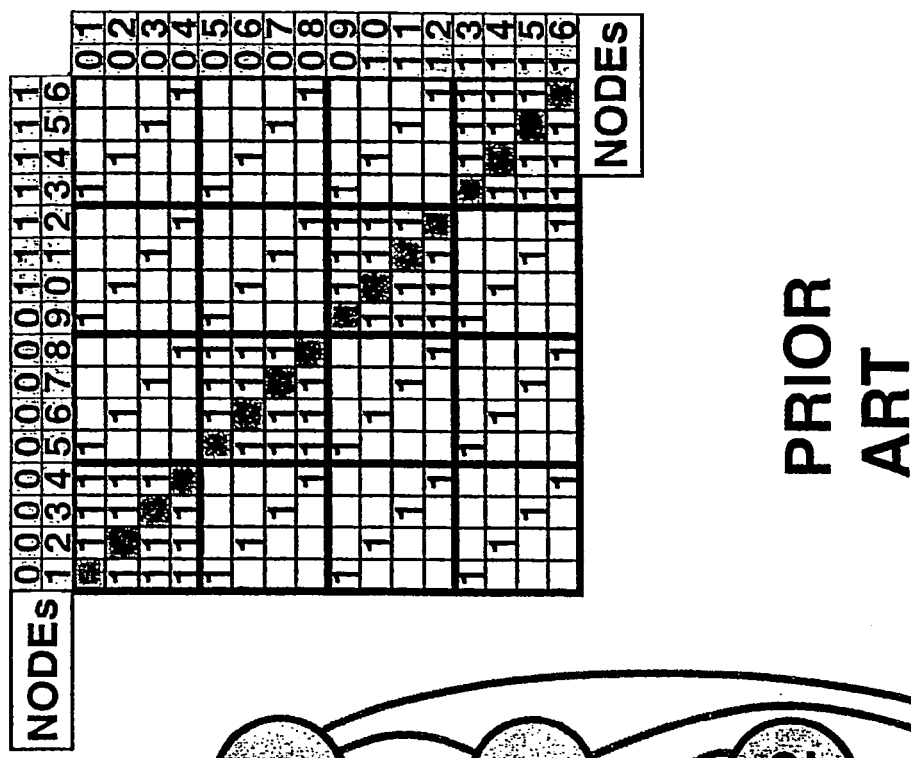
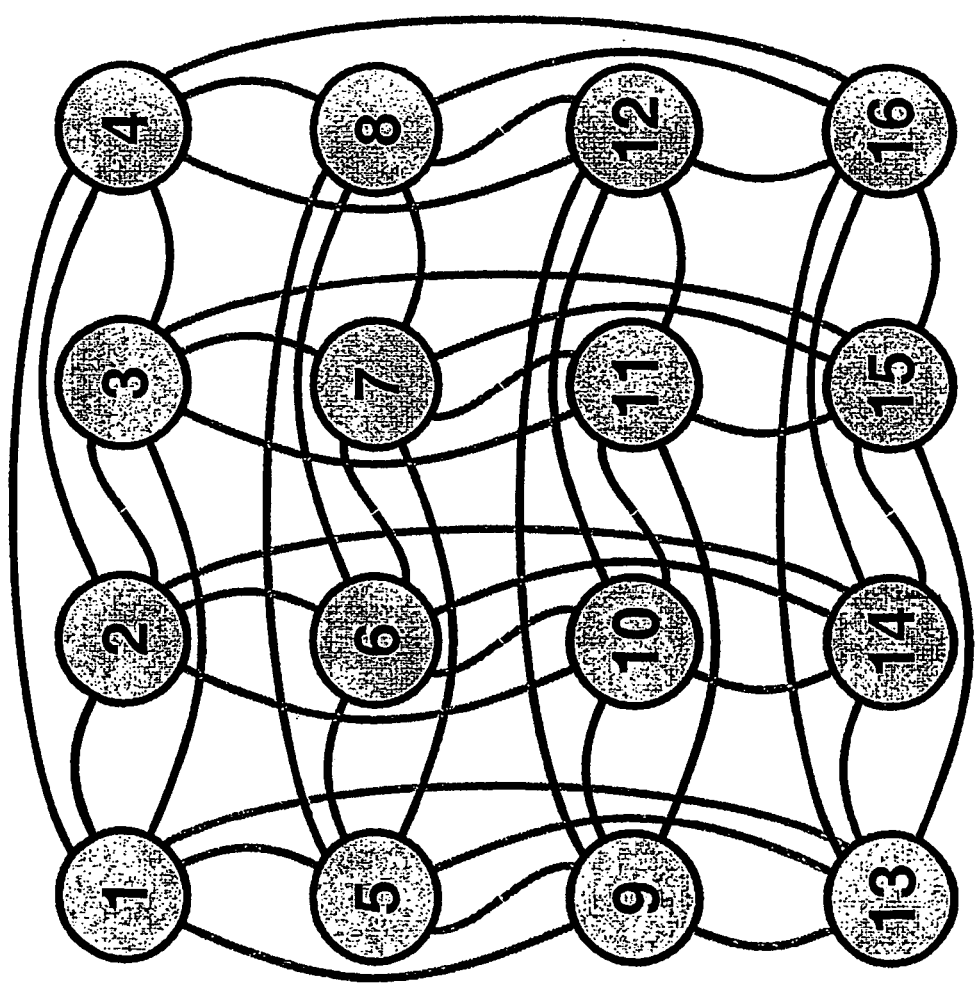
Figure 6
PRIOR ART

Each un-numbered node represents a Point Mesh of 6 links between 4 Nodes

PORT LABEL SWITCHING

It is often desirable for Communication Networks to accommodate changes in the source and/or destination of traffic and the total quantity of traffic. An example of this is a connection oriented Telecommunication Network which establishes and clears calls which have been initiated by a mechanism that originally employed physical dialling, and will be referred to in the present application as "Dial-Up". Another example is a Data Network used to transfer data of widely varying amounts between many computers which could operate using the Internet Protocol (IP). It can also be desirable to have redundancy mechanisms so that a level of service can still be achieved even when some failures have occurred within the Network.

Once a path has been established across a Dial-Up Network, it is expected to remain established for at least several seconds and perhaps many minutes or hours; and also to have a guarantee of a constant duplex data rate, whereas an IP Network has to handle bursts of simplex data. Many traditional Dial-Up Networks impose delay propagation restraints in order to ensure that good communications are not impaired, for example by echo.

Trying to use common equipment to carry in a reliable manner both Dial-Up traffic and IP traffic, without significantly impairing either of the two different types of traffic, creates so many problems that it is usually advisable not to mix them directly in the same multiplex, {for example Dial-Up and IP traffic both carried as IP} although of course they can be carried separately by the same transmission Network {e.g. carried by separate Virtual Containers (VC) in a Synchronous Digital Hierarchy (SDH) Network}.

One of the reasons for not directly mixing Dial-Up traffic and IP traffic, is that they require different algorithms within the Network: Dial-Up traffic requires call processing to establish calls; whereas IP traffic requires the forwarding of individual packets.

It is essential to note the fundamental difference between carrying IP traffic across a Network and carrying call based PSTN traffic across a Network, namely Dial-Up. A Dial-Up Network has to be able to ensure bandwidth is available for the duration of each call. An IP Network has to be able to send a packet from any input to any output, so in effect for IP traffic, paths are permanently enabled from all inputs to all outputs, but there is no guarantee of bandwidth. A solution will be described which enables IP and Dial-Up traffic to be carried across the same Network, provided certain arrangements are used.

For Dial-Up traffic and IP traffic to share a common Network, if the entire algorithm processing (for call processing and forwarding) could be done before entry into the common Network then it would still be possible to use different algorithms for the Dial-Up traffic and the IP traffic. The type of network topology employed by the common Network will affect the difficulty in achieving this.

Some arrangements for regular topological networks have either already been Patented or are subject to Patent Applications. Patent No. GB2343582B describes Partially Interconnected STAR Networks and Patent Application No. WO 01/84877 describes Partially Interconnected FLAT Networks. Patent Application No. GB0130729.7 describes Packet Traffic Optimisation. Patent Application No. GB0130730.5 combines several of the above techniques and details regarding this Patent and these Patent Applications are included herein for reference. Patent Application No. GB0130730.5 describes a partially interconnected network comprising a plurality of nodes, which nodes include either;

(a) Allocated Nodes and Star Nodes (STARs), wherein the Allocated Nodes are each allocated to one of a number of Areas (AREAs) and the partially interconnected network also comprises point to point interconnections between the Allocated Nodes and the STARs, where the number of AREAs with Allocated Nodes interconnected to an individual Star forms the number of Routes (ROUTEs) from an individual STAR, the Allocated Nodes of a first of the AREAs being interconnected to a set comprising some, but not all, of the STAR Nodes, and wherein further of the AREAs are similarly interconnected to further sets each comprising STAR Nodes and where there is at least one interconnection choice (CHOICE) between any two Allocated Nodes in different AREAs and where an interconnection route comprises two point to point interconnections interconnected in series by a STAR Node; or (b) at least six Topological Nodes, wherein a Topological Node is a single Physical Node or a group of interconnected Physical Nodes or part of a Physical Node or a group of interconnected Physical Nodes and parts of Physical Nodes, each Topological Node having at least three point-to-point Topological Links connecting it to some but not all of the plurality of Topological Nodes and where there is at least one Choice of routing between any two Topological Nodes and where a Choice of routing comprises either two point-to-point Topological Links connected in series at another of the Topological Nodes or a direct point-to-point Topological Link between the two Topological Nodes;

wherein at least one of the plurality of nodes includes a switching means arranged to carry out a Simple Transit Core Function and three or more of the plurality of nodes include a Single Link Interface which Single Link Interface has associated Output Attributes and/or Input Cognisant Attributes where each Simple Transit Core Function at one node is not logically connected to another Simple Transit Core Function at another node and each Simple Transit Core Function at one node is logically connected to at least three Single Link Interfaces at other nodes and wherein the nodes including Single Link Interfaces which are connected to one instance of a node arranged to carry out a Simple Transit Core Function are controlled by respective Intercommunicating Connection Acceptance Control Processes according to the respective Output Attributes and/or Input Cognisant Attributes.

A network which does not require the algorithm processing to be done by the network switches may be constructed from a network of similar multiple port communication switches.

According to the present invention there is a communications switch comprising, a plurality of numerically identified input traffic ports, a plurality of numerically identified output traffic ports, at least one significant label extraction means and at least one numerical processor, the communications switch being arranged whereby each message entering the communication switch by a numerically identified input traffic port contains a header, which header contains a label stack, which label stack includes at least one valid label, of which one valid label is a significant label and wherein the numerical value of the significant label contained within the header of a particular message which entered the communications switch via a particular numerically identified input traffic port is extracted by one of the at least one significant label extraction means and is supplied to one of the at least one numerical processors which numerical processor uses the significant label of the particular message and the numerical value of the particular numerically identified input traffic port to form a numerical result which directly equates to the number of the numerically identified output traffic port by which said particular message leaves the communications switch.

The present invention will now be described by way of example, with reference to the accompanying figures, in which:—

FIG. 6 shows a Partially Interconnected FLAT Network with 16 Topological Nodes according to a prior art invention;

Patent Application No. 0130730.5 described some Networks which employ Partially Interconnected STAR Networks and Partially Interconnected FLAT Networks.

A given example of a STAR Network by the above Patent Application was:

| Allocated Node | Split AREA | STAR | Split AREA | Allocated Node |
|---|---|---|---|---|
| MP | Crossconnect | STC | Crossconnect | MP |

A given example of a FLAT Network by the above Patent Application was:

| MP/STC | Point Mesh | MP/STC | Point Mesh | MP/STC |
|---|---|---|---|---|
| MP | Crossconnect | STC | Crossconnect | MP |

Where MP is a main processing node.

Where STC is a node containing a Simple Transit Core.

Both these types of Networks can involve traversing 5 nodes, of which the middle 3 nodes have been arranged to be two fixed crossconnects and a Simple Transit Core function.

Figure 1:
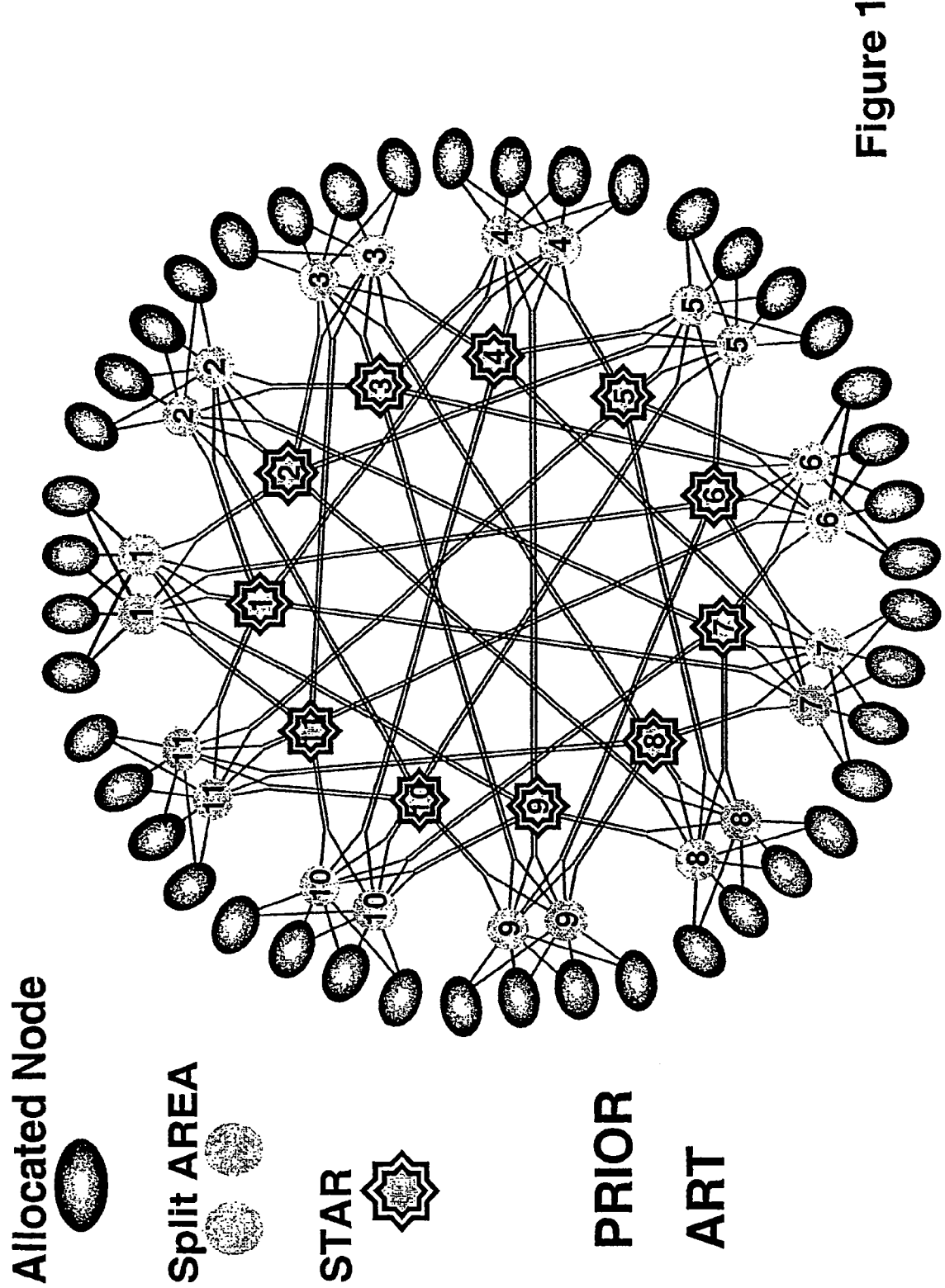
FIG. 1 shows a practical Partially Interconnected STAR Network, with split AREA and Allocated Nodes according to a prior art invention.

FIG. 1, of the present Patent Application, shows an example of a STAR Network. It was also FIG. 10 of Patent Application No. GB0130730.5. This is a small Network compared with some STAR Networks that can be formed from the BIBDs (Balanced Incomplete Block Designs) listed in THE CRC HANDBOOK OF COMBINATORIAL DESIGNS edited by Charles J. Colburne and Jeffrey H. Dinitz.

FIG. 1 of the present Patent Application classifies the nodes into: Edge Nodes; AREA Nodes; and STAR Nodes. It is a twin CHOICE Network as there are a CHOICE of 2 STARs that can be traversed when going from an Edge Node in one AREA to an Edge Node in another AREA. For example to go from an Edge Node in AREA 9 to an Edge Node in AREA 4: STAR 9 or STAR 3 can be traversed. There are also options for which AREA Nodes are used. So in this example 5 Nodes in total are traversed.

Figure 2:
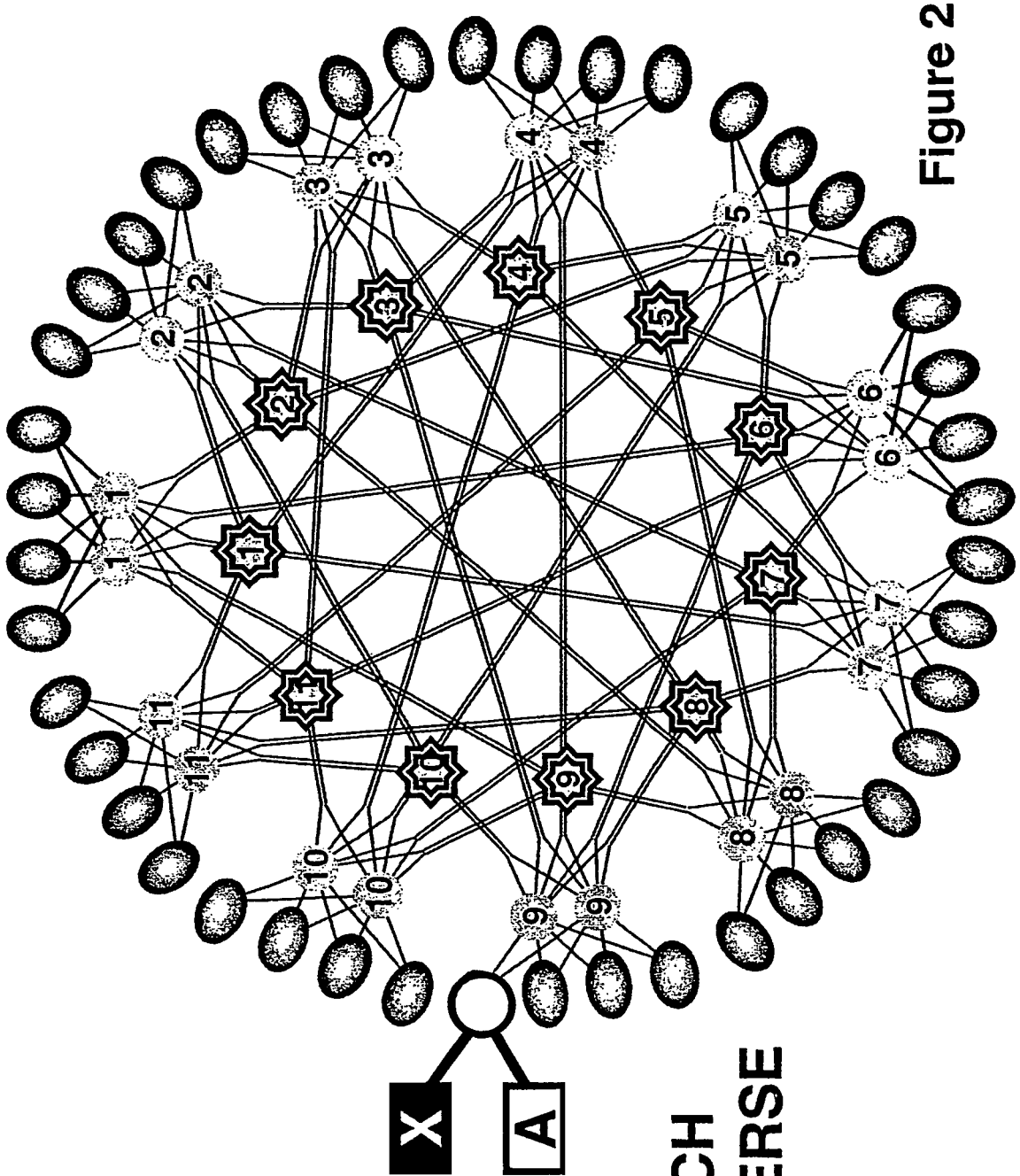
FIG. 2 shows FIG. 1 with two Gateways attached to the same Allocated Node.

FIG. 2 shows a simple connection between two Gateways on the same Edge Node. In this case only the Edge Node is traversed.

Figure 3:
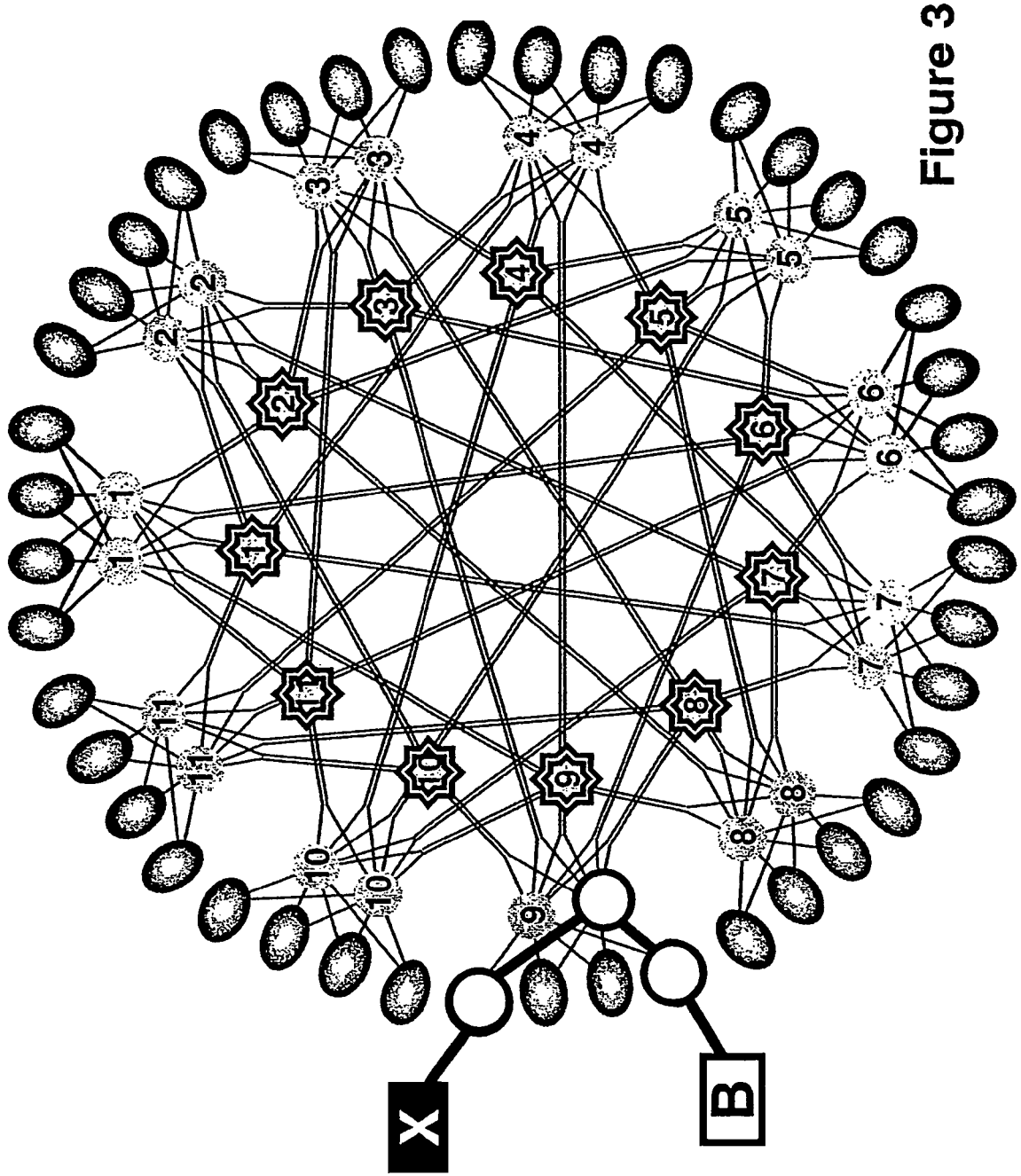
FIG. 3 shows FIG. 1 with two Gateways attached to different Allocated Nodes in the same AREA.

FIG. 3 shows a connection between two Gateways on different Edge Nodes which are both connected to the same pair of AREA Nodes. In this case two Edge Nodes and one AREA Node are traversed; a total of 3 switches.

Figure 4:
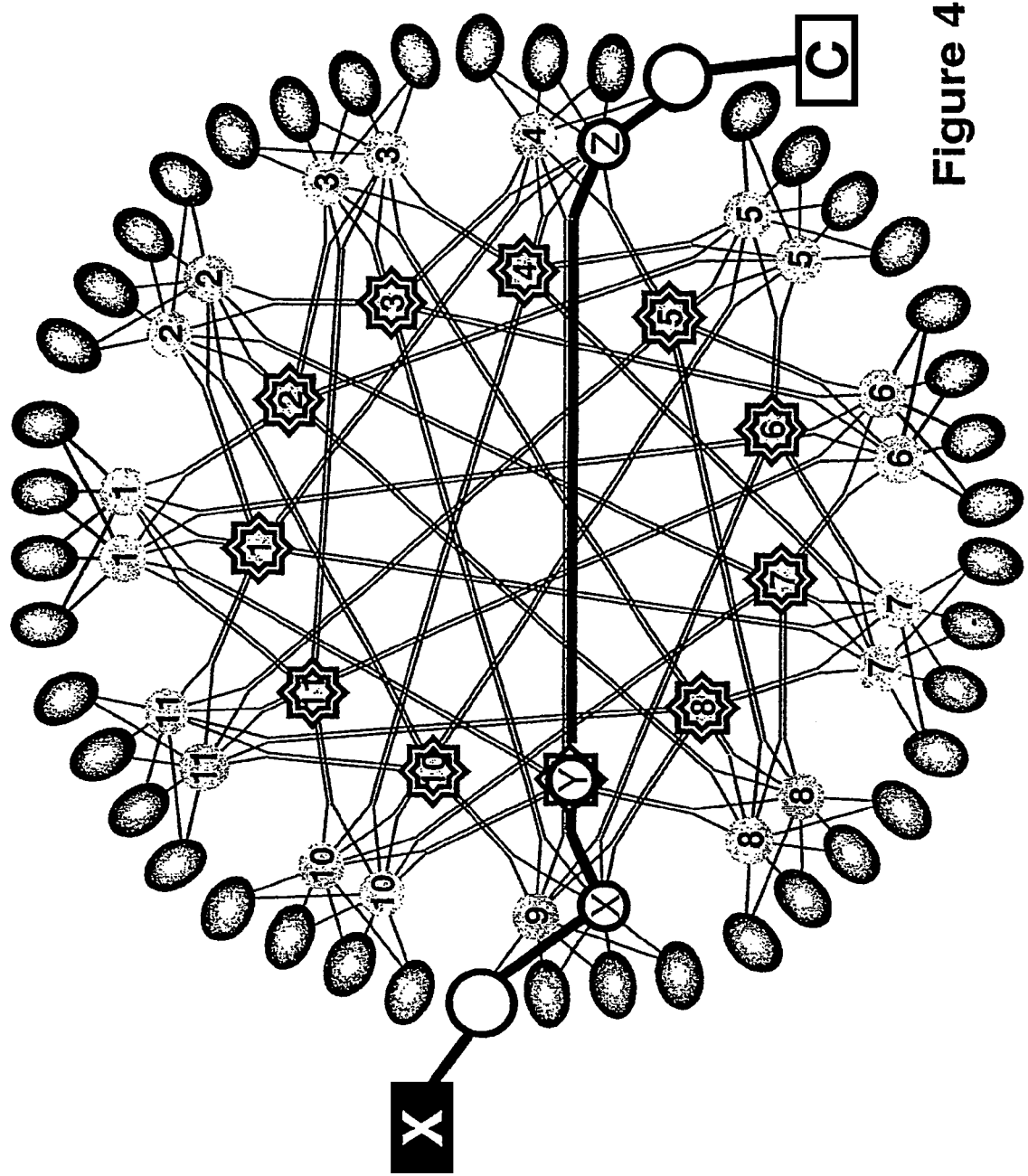
FIG. 4 shows FIG. 1 with two Gateways attached to different Allocated Nodes in different AREAs.

FIG. 4 shows a connection between two Gateways on different Edge Nodes which are connected to different pairs of AREA Nodes. In this case two Edge Nodes, two AREA Nodes and one STAR Node are traversed; a total of 5 switches.

Figure 5:
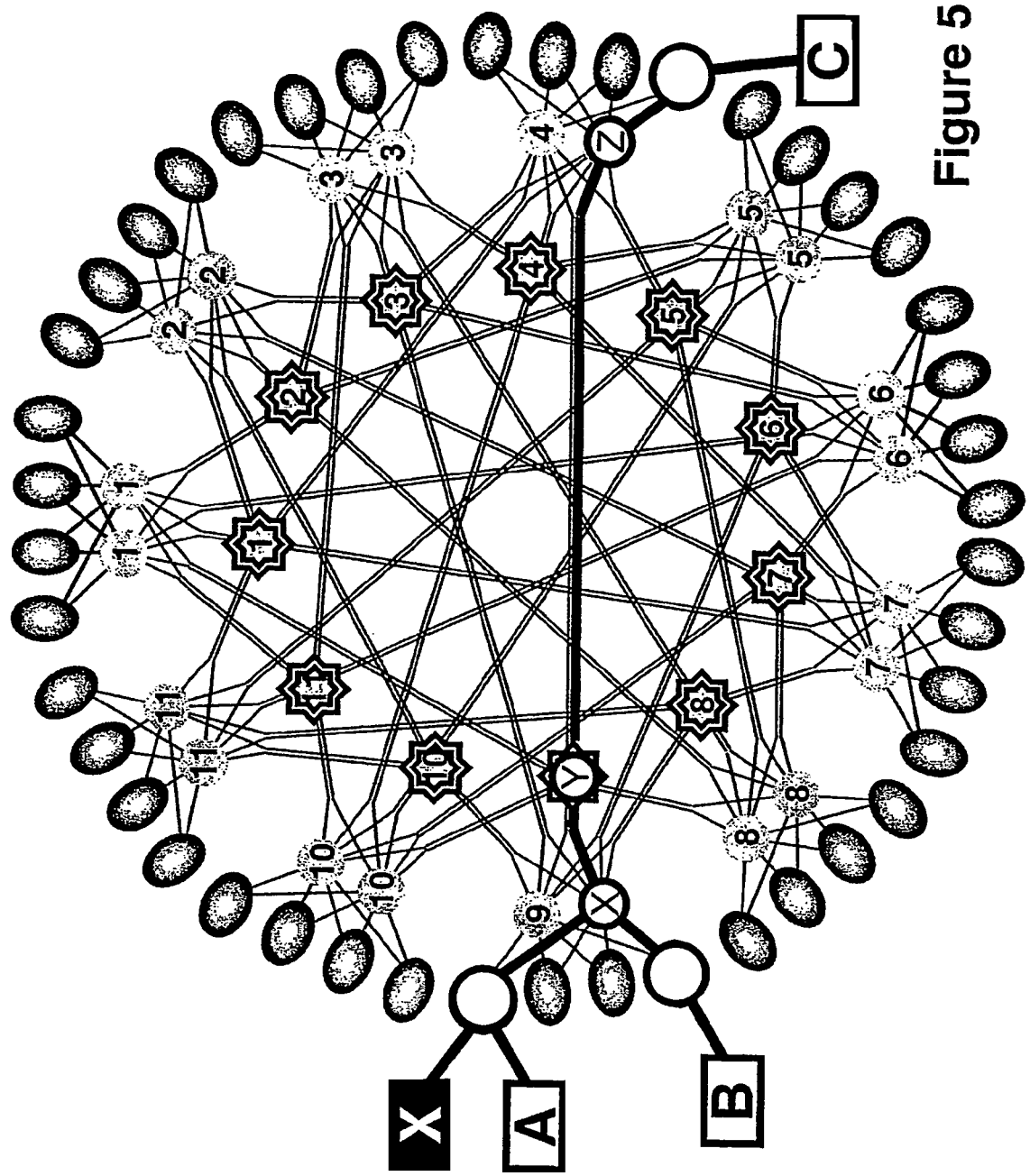
FIG. 5 shows a combination of FIGS. 2, 3 and 4.

In consequence in order to traverse a regular STAR topology Network, of the kind described, 1, 3 or 5 nodes have to be traversed to reach Gateways A, B or C respectively as shown in FIG. 5.

FIG. 6 of the present Patent Application shows an example of a FLAT Network. It was also FIG. 24 of Patent Application No. GB0130730.5. This has 16 Nodes to which Gateways may be attached. It can be considered as being formed from 8 Meshes each of 4 Nodes namely:

1, 2, 3 & 4 - - - 5, 6, 7 & 8 - - - 9, 10, 11 & 12 - - - 13, 14, 15 & 16

1, 5, 9 & 13 - - - 2, 6, 10 & 14 - - - 3, 7, 11 & 15 - - - 4, 8, 12 & 16

Figure 7:
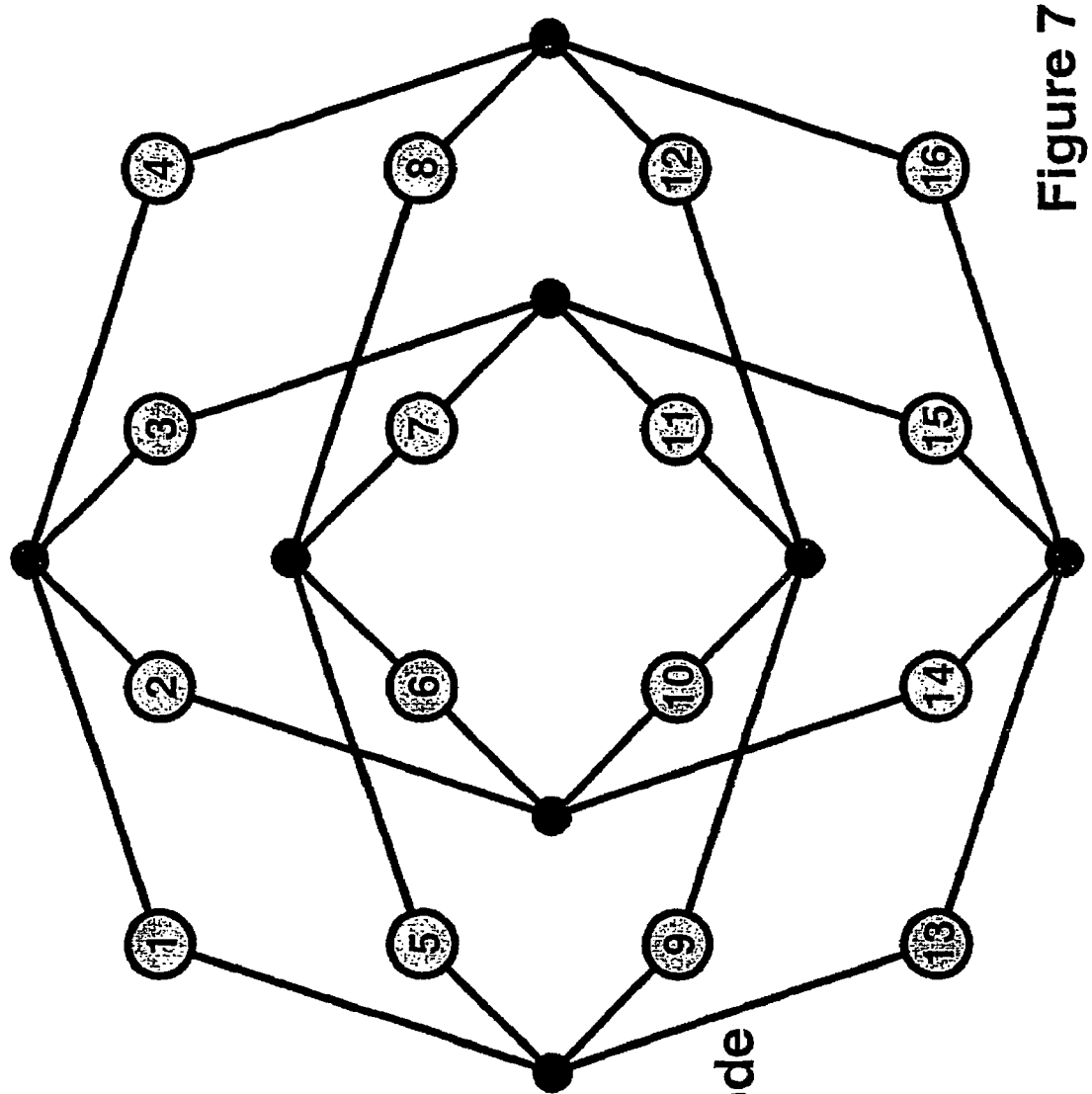
FIG. 7 shows the Partially Interconnected FLAT Network of FIG. 6 redrawn with Point Meshes according to a prior art invention.

FIG. 7, of the present Patent Application, shows the above example of a FLAT Network, but with the Meshes shown as Point Meshes. It was also FIG. 25 of Patent Application No. GB0130730.5. This has 16 Nodes to which Gateways may be attached and the 8 Point Mesh Nodes to which Gateways may not be attached.

This is a small Network compared with some FLAT Networks that can be formed from the SRGs (Strongly Regular Graphs) listed in THE CRC HANDBOOK OF COMBINATORIAL DESIGNS edited by Charles J. Colburne and Jeffrey H. Dinitz.

Figure 8:
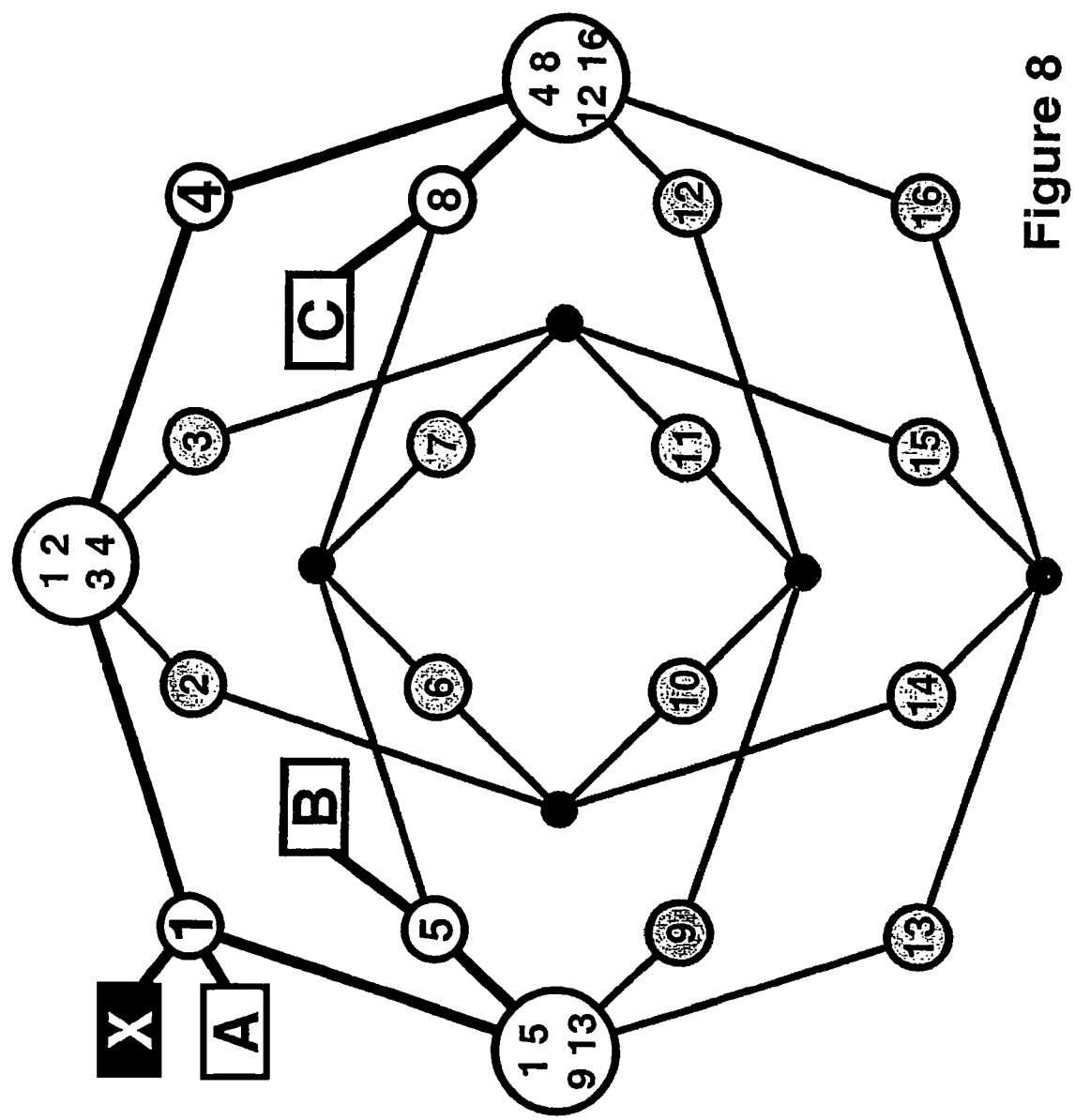
FIG. 8 shows FIG. 7 with three Gateways attached to four Topological Nodes.

Traversing this FLAT Network also requires 1, 3 or 5 nodes to be traversed to reach Gateways A, B or C respectively, as shown in FIG. 8.

To reach Gateway A traverse
Node 1;
To reach Gateway B traverse
Node 1, Node (1, 5, 9 & 13) and Node 5;
To reach Gateway C traverse
Node 1, Node (1, 2, 3 & 4), Node 4, Node (4, 8, 12 & 16) and Node 8.

Returning to FIG. 4, assuming each Allocated Edge node has at least one gateway, then an Allocated Edge node must have at least 3 ports. Each split AREA node is shown with 9 ports, and each STAR with 10 ports. So to specify the route across the Network, as shown in FIG. 4, from one gateway to another gateway, requires in effect 5 address fields say of 4 bits each.

So:
the first of the five fields defines the output port from the first Allocated Edge Node;
the second of the five fields defines the output port from the first AREA Node;
the third of the five fields defines the output port from the STAR Node;
the fourth of the five fields defines the output port from the second AREA Node;
the fifth of the five fields defines the output port from the final Edge Allocated Node.

Asynchronous Transfer Mode (ATM) is a multiplex method that was designed so that it could be operated by Dial-Up call control, although the format uses fixed length packets called cells rather than fixed time division multiplexing. The addressing range of ATM has a maximum size of 28 bits and is arranged as two fields one of 12 bits (or 8 bits for User Network Interfaces) of Virtual Path Indicator (VPI) and the other of 16 bits of Virtual Connection Indicator (VCI). Because ATM was designed with call control in mind the addressing range only needed to be sufficient to indicate individual connections within the multiplex using the VCI field: the VPI field could be used for traversing any ATM cross-connects to the next switch acting under call control. ATM was not designed with having say 5 separate address fields where each address field is to define the output port of 5 switches to be traversed.

ATM uses Header Translation Tables because a particular value in part of the address field does not always directly correspond to a particular output port. A key feature of the present Patent Application is that a specific part of the address contained in the header directly defines the output port to be used to exit from the switch.

Port Label Switching is the name that is being given to a technique in the present Patent Application whereby the header of a cell, frame or packet contains a stack of Labels, where each Label is intended to specify directly the numerical identities of output traffic ports. For example where a Label contains the numerical value 167; this means that the cell, frame or packet should leave the switch that the label relates to via the output traffic port with the numerical identity of 167. In the present Patent Application the label, that a switch should act upon, is call the Significant Label. The Significant Label is one of the labels contained within a stack of labels. However although such a technique can be used another technique is rather more useful.

Relative Port Label Switching is similar to Port Label Switching, but with an important difference. The numerical identity of the output traffic port that should be used to leave the switch is not just dependent on the numerical value of the Significant Label, but it is also dependent on the numerical identity of the input traffic port that was used to enter the switch. Basically the numerical value of the Significant Label and the numerical identity of the input traffic port are added together, using Modulo Addition, to form the numerical identity of the output traffic port.

Figure 9:
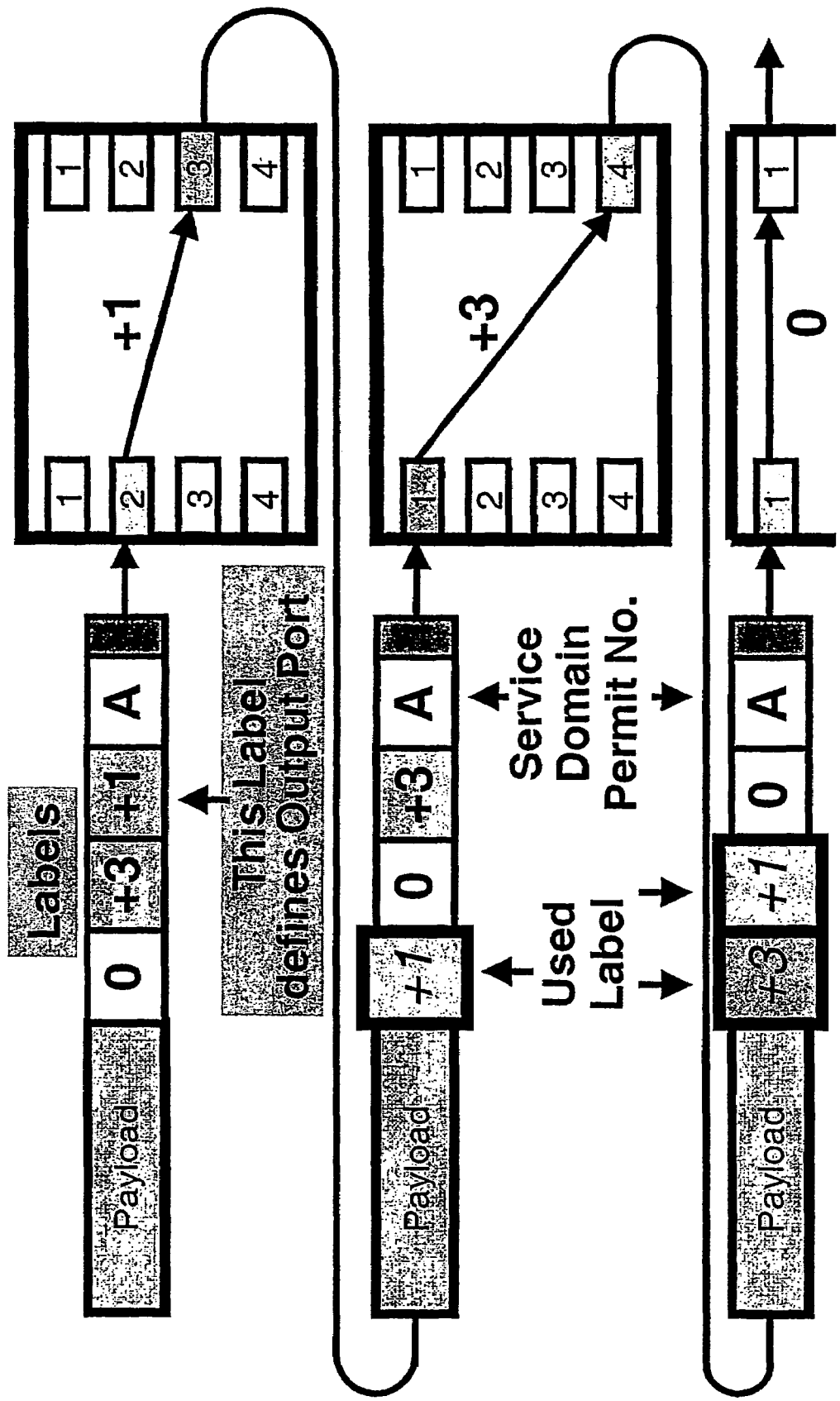
FIG. 9 shows a diagrammatic view illustrating an example of Relative Port Label Switching.

Relative Port Label Switching requires a port label for every switch traversed. For simplicity FIG. 9 shows only 3 labels in the header.

Although directly addressed port labels could be used Relative Port Labels will be described as they have a particular advantage.

For Relative Port Label Switching, the header of a packet must contain a Stack of Relative Port Labels and a Service Domain Permit Number. FIG. 9 shows the packet being sent from left to right with the first label (+1) being before the other labels in the Stack and after the Service Domain Permit Number.

When a packet arrives at an Input Port of a switch the numerical value of the Significant Relative Port Label will be used. The numerical value of the Significant Relative Port Label received is added to the numerical identity of the input traffic port (Modulo Addition) to determine the numerical identity of the output traffic port.

The switches shown in FIG. 9 are 4 port switches.
At the first switch in FIG. 9: 2+1=3 so the path traverses from Port 2 to Port 3.
At the second switch in FIG. 9: 1+3=4 so the path traverses from Port 1 to Port 4.
At the third switch in FIG. 9: 1+0=1 so the path traverses from Port 1 to Port 1.

The addition performed has to be a modulo addition because in this example if the result of the addition is greater than 4, then 4 has to be subtracted from the result.

The switches do not need to have header translation tables in order to do the switching, nor do they need call processing, because the Relative Port Labels have been prepared in the Gateway units, which will be further discussed later.

The switches may move the used labels to the end of the Stack once they have been used. An advantage of using Relative Port Labels is that once the Network has been traversed, the path traversed across the Network can be deduced from the used Relative Port Labels. This is not possible if basic Port Label Switching was used.

A way that the basic Port Label Switching arrangement could be used to create a form or reverse addressing is as follows. Once the Significant Label of a message has been used by a switch, then the contents of the Significant Label can be replaced with the numerical identity of the input traffic port by which that message entered the switch. Provided this was done by all the traversed switches, then the resulting Stack of Labels should indicate the path back through the network using the Port Label Switching arrangement.

Figure 10:
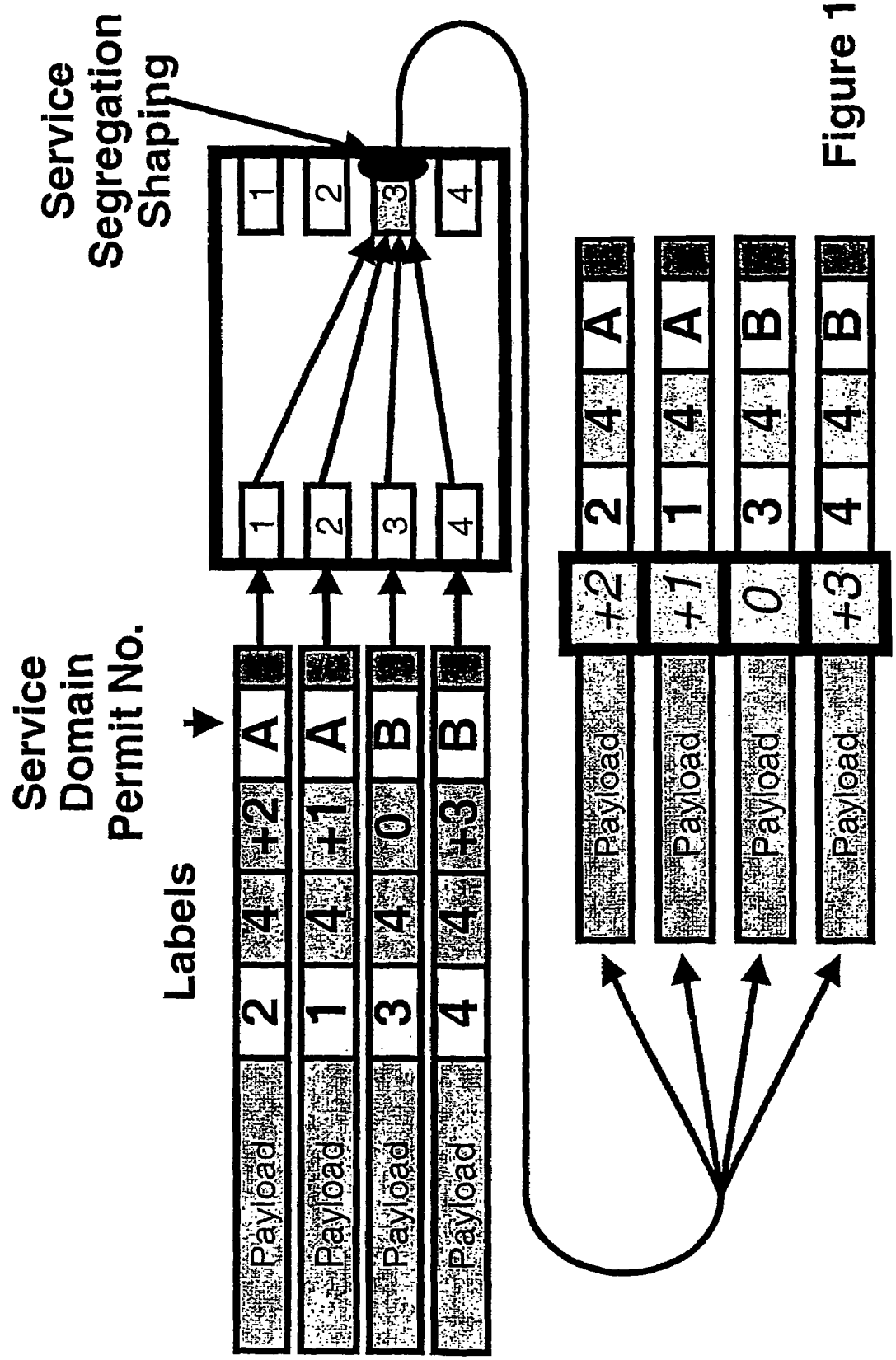
FIG. 10 shows a diagrammatic view illustrating the use of Service Domain Permits with Relative Port Label Switching.

Another characteristic of Relative Port Label Switching is the ability to have Service Domain Permits. FIG. 10 shows several packets from different ports all being switched through to port 3. In order to ensure that Port 3 does not have to handle too much traffic and consequential traffic discarding, then a protection mechanism is required. The protection mechanism is not to prevent traffic being discarded by one service because that service is sending too much traffic via Port 3, but to make sure that one service sending too much traffic (for example Service Domain A) does not disturb the quality of service within another Service Domain (for example Service Domain B).

Figure 11:
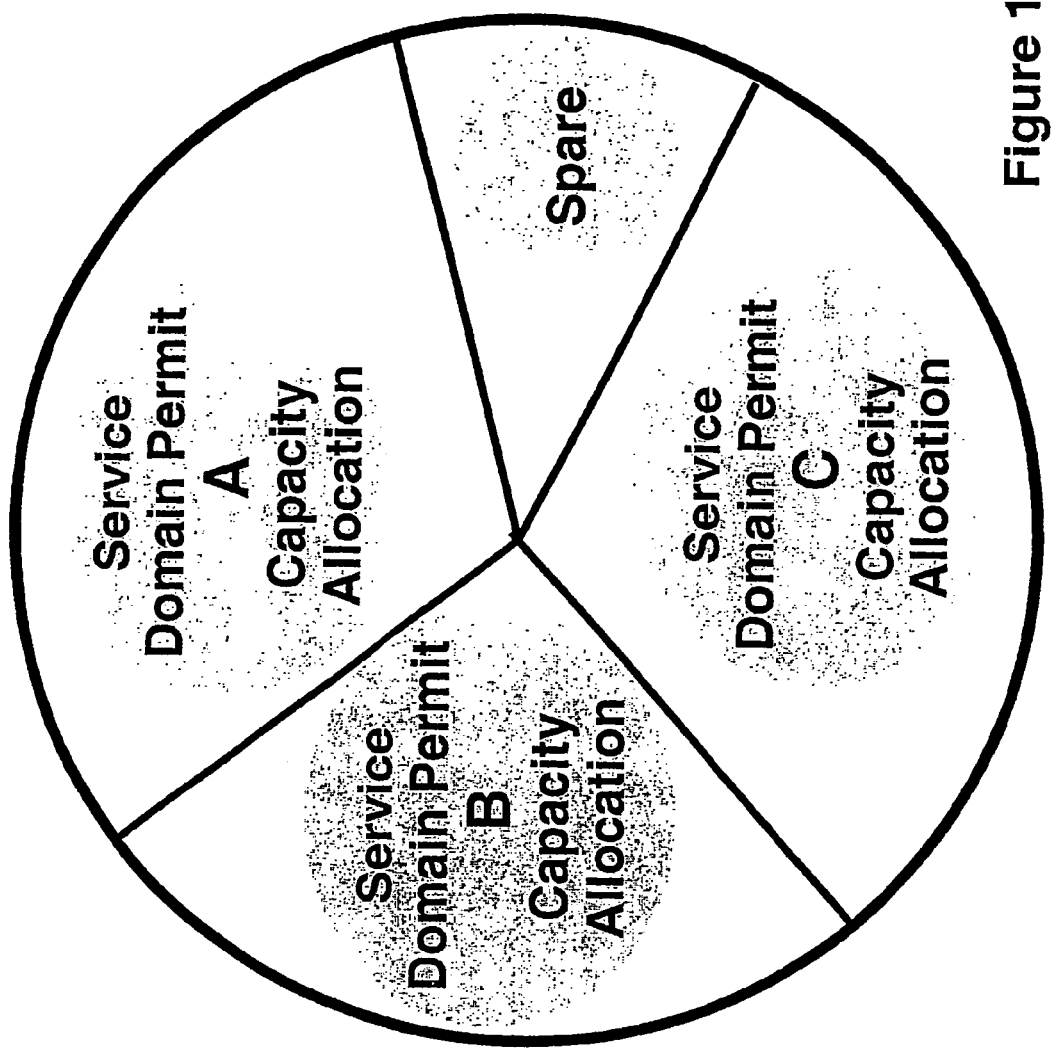
FIG. 11 shows a diagrammatic view illustrating the summation of Service Domain Permits.

Each output port has to have a Capacity Allocation set for each Service Domain permitted to use that output port. The sum of those Capacity Allocations should not exceed the capacity of that output port, see FIG. 11. When a Service Domain does exceed its permitted Capacity Allocation then discards may occur and a Service Domain Permit Violation may be initiated. The Capacity Allocations may include Bandwidth Parameters, Queuing Parameters, Buffering Parameters etc.

It should be noted that Service Domain Permits, although they are similar to the Output Attributes and/or Input Cognisant Attributes associated with Single Link Interfaces described in Patent Application No. GB0130730.5, are additional functions that are required for Relative Port Label Switching.

Relative Port Label Switching can be used for carrying IP traffic across a network, provided the number of labels in a stack equals the number of switches to be traversed. In order to do this an entry Gateway would have to determine from the IP address the route to be taken across the Network and generate the appropriate valid Stack of Relative Port Labels. This would not be so easy for a random meandering Network, but would be relatively straightforward for a structured Network of the form shown in FIG. 1.

All the switches at the Edge Nodes, AREA Nodes and STAR Nodes are Relative Port Label switches.

The Gateways have to format the traffic to be carried into the cell/packet/frames with the Stack of Relative Port Labels. (Similar to the ATM Adaptation Layer.)

To carry Dial-Up type traffic across a Regular Network, call processing must be able to create the complete Stack of Relative Port Labels. Call processing intelligence is only at the Edge Nodes.

To go between the Gateways attached to the same Edge Node, as shown in FIG. 2, requires a Stack of Labels, with only one Valid Relative Port Label as there is only one switch to traverse. Each cell, packet or frame of a call leaving a Gateway carries a Stack with one Valid Relative Port Label. This arrangement does not need the Packet Traffic Optimisation (PTO) Algorithm as described in Patent Application No. GB0130729.7.

If there is call processing intelligence at the Edge Node attached to the two Gateways, then the one Valid Relative Port Label can be produced.

To go between the Gateways attached to Different Edge Nodes, which are connected to the same AREA Node, as shown in FIG. 3, requires a Stack of Labels with three Valid Relative Port Labels as there are three switches to traverse. Each cell, packet or frame of a call leaving a Gateway carries a Stack of three Valid Relative Port Labels. This arrangement uses the Packet Traffic Optimisation Algorithm as described in Patent Application No. GB0130729.7.

If there is call processing intelligence at both the Edge Nodes attached to the two Gateways, then the three Valid Labels can be produced: provided there is signalling communication between the Intelligent call processing functions at the two Edge Nodes: and consequently a Simple Transit Core (STC) function, as described by the PTO method in Patent Application No. GB0130729.7, can operate in the AREA Node. The AREA Node is a traversed switch, which is not associated with an intelligent node, yet it provides per call consolidation using the PTO protected managed over-provisioning algorithm.

To go between the Gateways attached to Different Edge Nodes, which are not in the same AREA, as shown in FIG. 4, requires a Stack of Labels with five Valid Relative Port Labels, as there are five switches to traverse. Each cell, packet or frame of a call leaving a Gateway carries a Stack of five Valid Relative Port Labels. This arrangement can still use the PTO Algorithm as described in Patent Application No. GB0130729.7.

If there is call processing intelligence at both the Edge Nodes attached to the two Gateways, then the five Valid Labels can be produced: provided there is signalling communication between the Intelligent call processing functions at the two Edge Nodes; and provided that the AREA Nodes (X and Z) act only as consolidating crossconnects: and consequently a Simple Transit Core (STC) function, as described by the PTO method in Patent Application No. GB0130729.7, can operate in the STAR Node (Y). STAR Node (Y) is a traversed switch, which is not associated with an intelligent node, yet it provides per call consolidation using the PTO protected managed over-provisioning algorithm. The AREA Nodes (X and Z) are traversed switches, which are not associated with intelligent nodes, but they only provide fixed consolidation under static management control for paths traversing 5 switches.

There are some benefits that result from using regular network topologies of the form shown in FIGS. 5 and 8. One is that certain numbers of nodes have to be traversed, e.g. 1, 3 of 5. If Point Meshes were not included then in FIG. 8 it would be 1, 2 or 3 Nodes. Consequently the number of Valid Labels in a header should correspond to the number of nodes to be traversed (otherwise an error can be assumed). There are also some other conditions which have to apply. In FIG. 5 if the Header only has one label then that label should not indicate an output port that is connected to an AREA; to be valid it should point to a port connected to a Gateway. It also follows that the first label of a header with 3 or 5 labels should not point to a port connected to a Gateway.

Some rules for FIG. 5 are:

Only the last valid label should point to a port connected to a gateway.

The penultimate valid label should point to a port connected to an Allocated Edge Node.

The first valid label, of 3 or 5 valid labels, should point to a port connected to an AREA Node.

The second valid label, of 5 valid labels should point to a port connected to a STAR Node.

A valid label cannot be zero (otherwise it would point back to itself).

This should ensure that a path of STAR to AREA to STAR is invalid and also AREA to EDGE to AREA is also invalid.

A practical means of applying these rules for Partially Interconnected STAR Networks is to allocate the links status levels:

| Level 1 | Gateway to Allocated Edge Node |
| Level 2 | Allocated Edge Node to AREA Node |
| Level 3 | AREA Node to STAR Node |

Compliance to the following is required for STAR Networks:

| Connection Rules | One Valid Label | Three Valid Labels | Five Valid Labels |
| --- | --- | --- | --- |
| First Label | Level 1 to Level 1 | Level 1 to Level 2 | Level 1 to Level 2 |
| Second Label | — | Level 2 to Level 2 | Level 2 to Level 3 |
| Third Label | — | Level 2 to Level 1 | Level 3 to Level 3 |
| Fourth Label | — | — | Level 3 to Level 2 |
| Fifth Label | — | — | Level 2 to Level 1 |

It is different for Partially Interconnected FLAT Networks as shown in FIG. 8 as only 2 Levels exist:

| Level 1 | Gateway to MP/STC Node |
|---|---|
| Level 2 | MP/STC Node to Point Mesh Node |

Accordingly compliance to the following is required for FLAT Networks WITH POINT MESHES:

| Connection Rules | One Valid Label | Three Valid Labels | Five Valid Labels |
|---|---|---|---|
| First Label | Level 1 to Level 1 | Level 1 to Level 2 | Level 1 to Level 2 |
| SecondLabel | — | Level 2 to Level 2 | Level 2 to Level 2 |
| Third Label | — | Level 2 to Level 1 | Level 2 to Level 2 |
| Fourth Label | — | — | Level 2 to Level 2 |
| Fifth Label | — | — | Level 2 to Level 1 |

For Partially Interconnected FLAT Networks as shown in FIG. 6 again only 2 Levels exist:

| Level 1 | Gateway to MP/STC Node |
|---|---|
| Level 2 | MP/STC Node to MP/STC Node |

Accordingly compliance to the following is required for FLAT Networks WITHOUT POINT MESHES:

| Connection Rules | One Valid Label | Two Valid Labels | Three Valid Labels |
|---|---|---|---|
| First Label | Level 1 to Level 1 | Level 1 to Level 2 | Level 1 to Level 2 |
| SecondLabel | — | Level 2 to Level 1 | Level 2 to Level 2 |
| Third Label | — | — | Level 2 to Level 1 |

In order to indicate an invalid label a Parity bit could be included with each label. A label of zero with bad parity can be used to indicate an invalid label (e.g. for when the label is not needed). Using parity also helps in finding any corruption of a label. The Service Domain Permit Number can also have a parity bit.

As already mentioned, an advantage of using Relative Port Labels is that once the Network has been traversed the path traversed across the Network can be deduced from the used Relative Port Labels. This feature can be exploited in several ways although these exploitations do tend to rely on the regular nature of Partially Interconnected Star Networks and Partially Interconnected FLAT Networks.

By setting a broadcast indicator in the header of a message a Broadcast Investigation Message can be sent with the labels initially all being set to the invalid state: the payload may contain test and identification information (e.g. IP address of the Originating Gateway). The Service Domain Permit Number should correspond to the Service Domain that is being investigated, or the Service Domain Permit Number can be set to Zero (with good parity) to indicate that the investigation is not limited to a Service Domain. At the first switch, a message is sent out from all ports, except the port the message arrived on, but with one label now set to indicate the module addition necessary to derive the output port number from the input port number, to create the same effect as if the label had been used and placed at the end of the stack. This proceeds as the network is traversed, but in order to stop messages trying to follow inappropriate paths or going around loops etc. then certain rules corresponding to ones listed above are also applied so that for example a path of STAR to AREA to STAR is invalid and also AREA to EDGE to AREA is also invalid.

The use of a Broadcast message from Gateway X should result in all the other Gateways receiving a number of messages. The number of messages corresponding to the total number of apparently acceptable CHOICEs of routing across the network.

|  | via 1 node | via 3 nodes | via 5 nodes |
|---|---|---|---|
| X to A | 1 | 0 | 10 |
| X to B | 0 | 2 | 10 |
| X to C | 0 | 0 | 8 |

By setting a Response indicator in the payload of a message a Broadcast Investigation Response Message can be formed by the gateways that have received Broadcast Investigation Messages: again the payload contains test and identification information (e.g. IP address of responding Gateway). Hence it is possible for a Gateway to learn the labels required to reach other gateways and to learn the identities of those Gateways. This information can be used to see if there has been a change in the possible routes, because of failures or reconfigurations. The complexity of forming these messages and interpreting the results is the responsibility of the Gateways, the only special function for the Relative Port Label Switches is to handle broadcast messages and apply the Connection Rules defined above.

By using Relative Port Label Switches it is possible to do this process across a network which uses very simple switches. There is no requirement for Header Translation Tables or Routing tables to be handled by the Relative Port Label Switches themselves.

A Service Domain Permit Violation can occur when a message has had to be discarded. It could also be triggered at a lower level if required (say 85% occupancy). The action taken by a Relative Port Label Switch when a Service Domain Permit Violation is triggered is to send out a broadcast message (containing a Violation Indicator) for that Service Domain in the opposite direction, i.e. back towards all the Gateways who may be supplying too much traffic, or who could supply traffic to this particular point of the network for that Service Domain. The Gateways who received the Service Domain Permit Violation messages should then avoid using the label stacks, for the affected Service Domain, that directly correspond to the one received in the Service Domain Permit Violation messages.

The object of Service Domain Permits and discarding messages is to protect other Service Domains. They do not automatically protect circuits within a Service Domain from affecting one another. Packet Traffic Optimisation (PTO) is a method of ensuring Dial-Up type circuits within a Service Domain do not interfere with one another. When traversing 5 Nodes, as shown in FIG. 4, and using PTO, then the Call processing and PTO processing should be done at the Edge Node and then the Gateways supplied with the required Relative Port Label Stacks by the Edge Nodes.

Multi Protocol Label Switching (MPLS) is a recognised technique. It neither uses the labels for the direct addressing of the output ports, nor the relative addressing of the output ports.

When a Gateway receives a Broadcast Investigation Message or a Service Domain Permit Violation Message, it needs to deduce the Relative Port Labels (Reverse Stack) to retrace the path back to the source of the message. So for each label assuming it has L bits (not including parity) then:

Value of Reverse Label equals $2^L$—Value of Original Label

This deduction has to be done for each Label.

FIGS. 12 to 18 show in considerable detail the actions that are required when traversing the 5 nodes as shown in FIG. 4.

Figure 12:
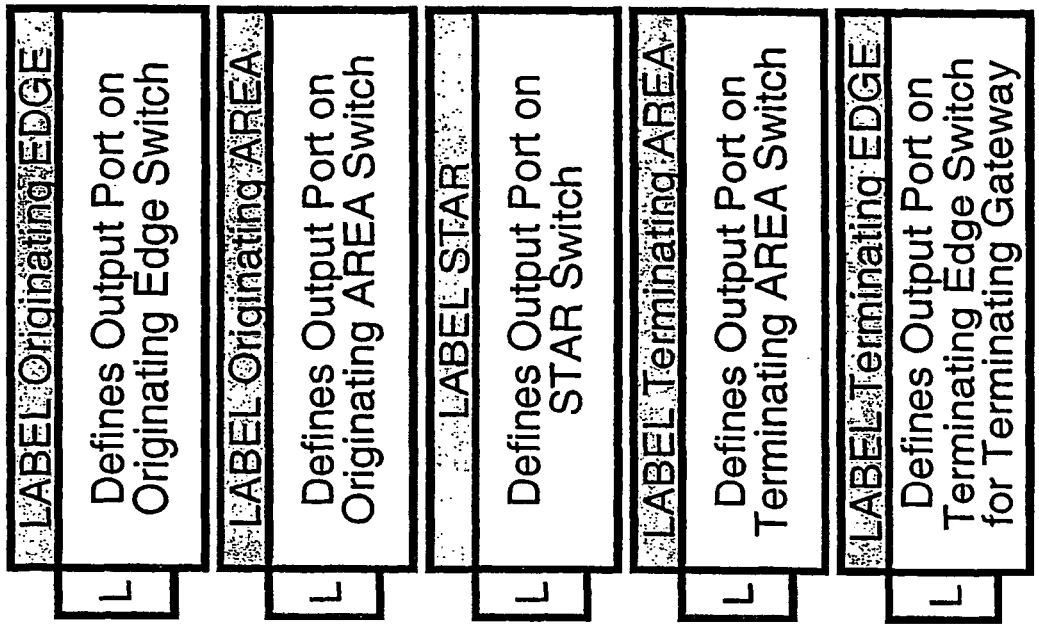
FIG. 12 shows a diagrammatic representation of Relative Port Labels at a Gateway.

FIG. 12 shows the initial Relative Port Label Stack. It assumes that all the switches require L bits for each Label as they may have up to $2^L$ ports.

Figure 13:
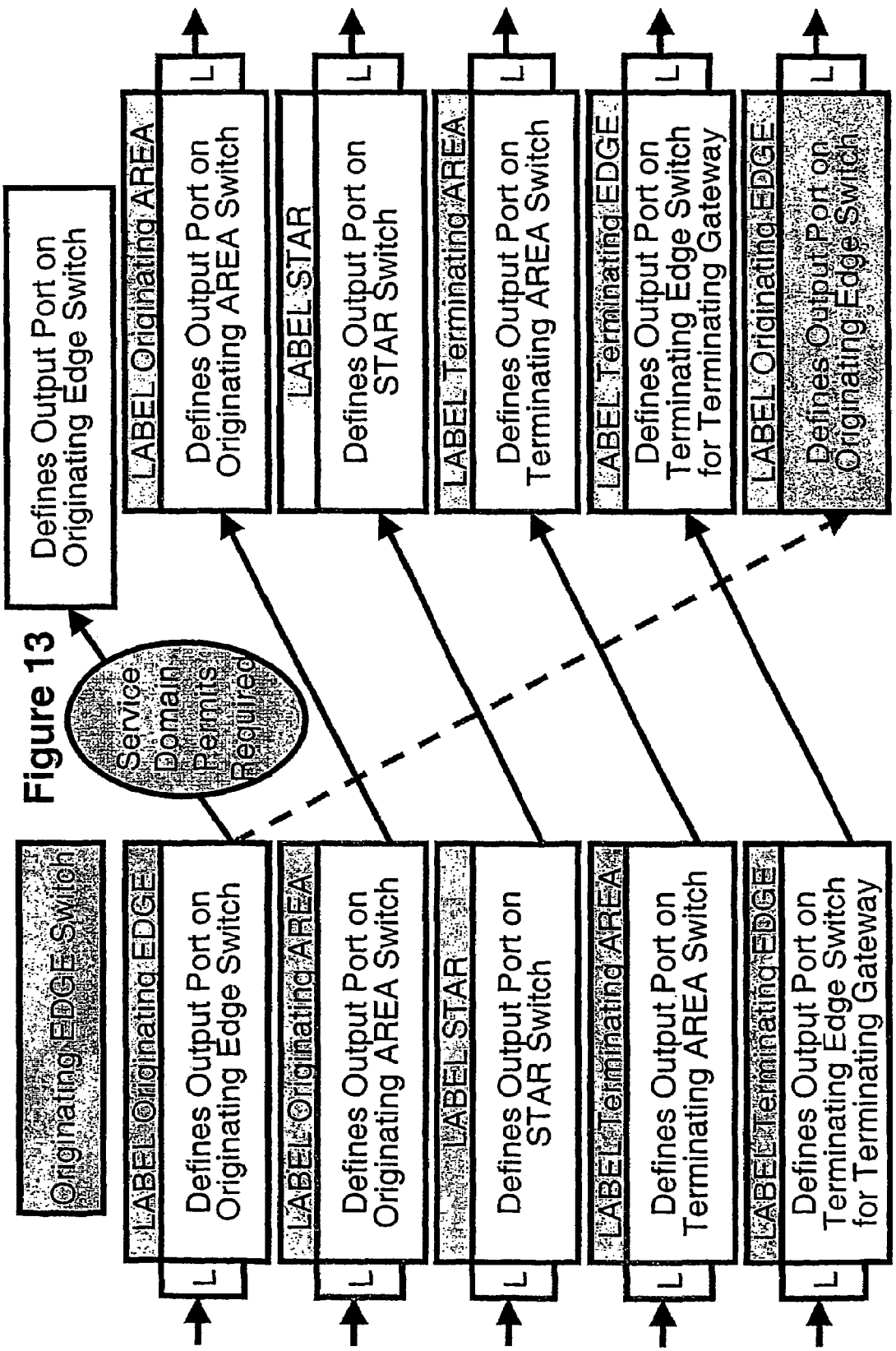
FIG. 13 shows a diagrammatic view illustrating the action of Relative Port Label Switching at an Originating Allocated Edge Node.

FIG. 13 shows the action required at the Originating Allocated Edge Node. The Top Label is used to define the output port and is then placed at the bottom of the Stack, with the other labels shufling up one position. The Capacity Allocation of the Service Domain Permit should be checked to ensure it is not exceeded.

Figure 14:
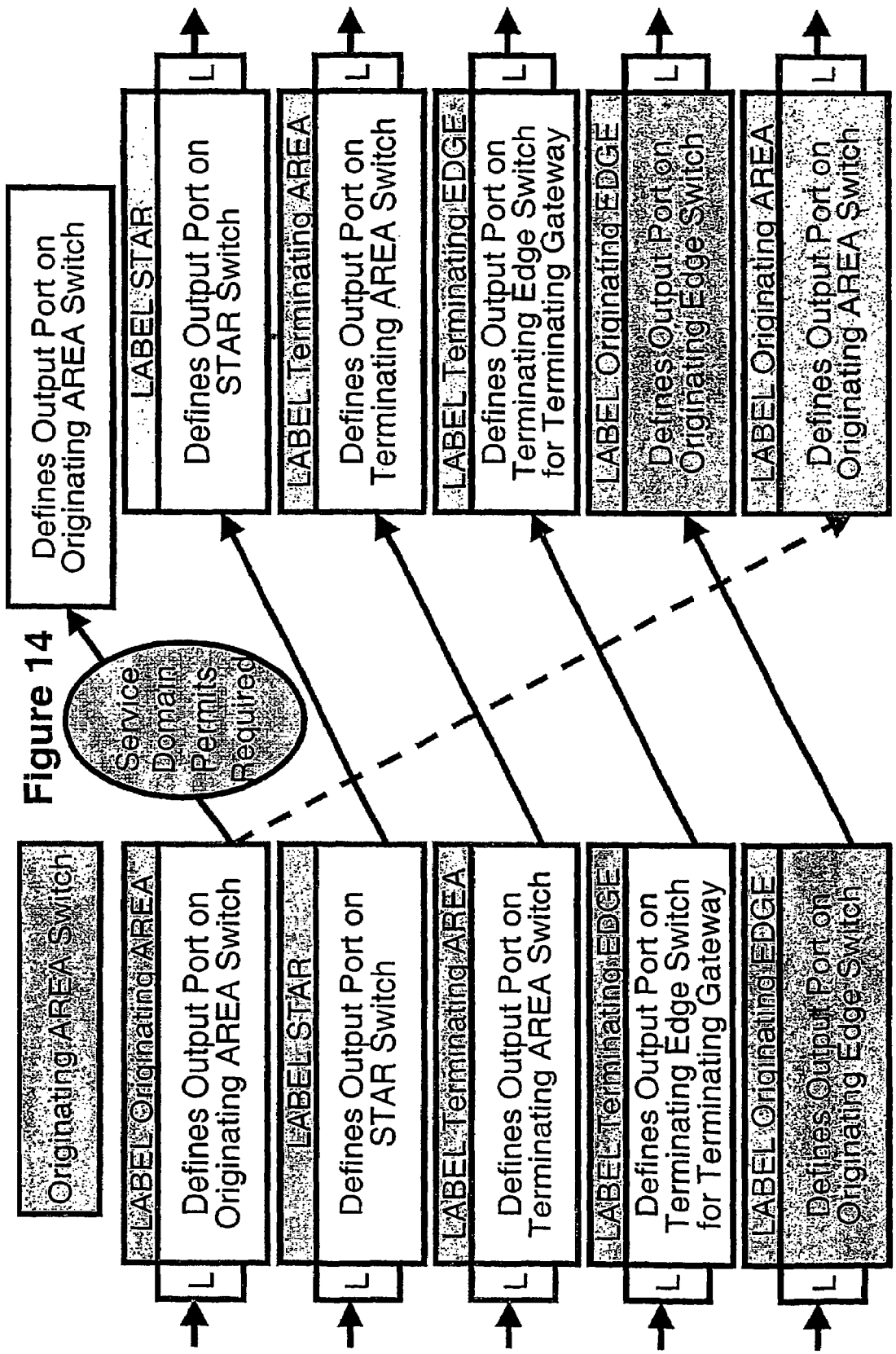
FIG. 14 shows a diagrammatic view illustrating the action of Relative Port Label Switching at an Originating AREA Node.

FIG. 14 shows the action required at the Originating AREA Node Switch, and as for FIG. 13 the Top Label is used to define the output port and is then placed at the bottom of the Stack, with the other labels shuffling up one position. The Capacity Allocation of the Service Domain Permit should be checked to ensure it is not exceeded.

Figure 15:
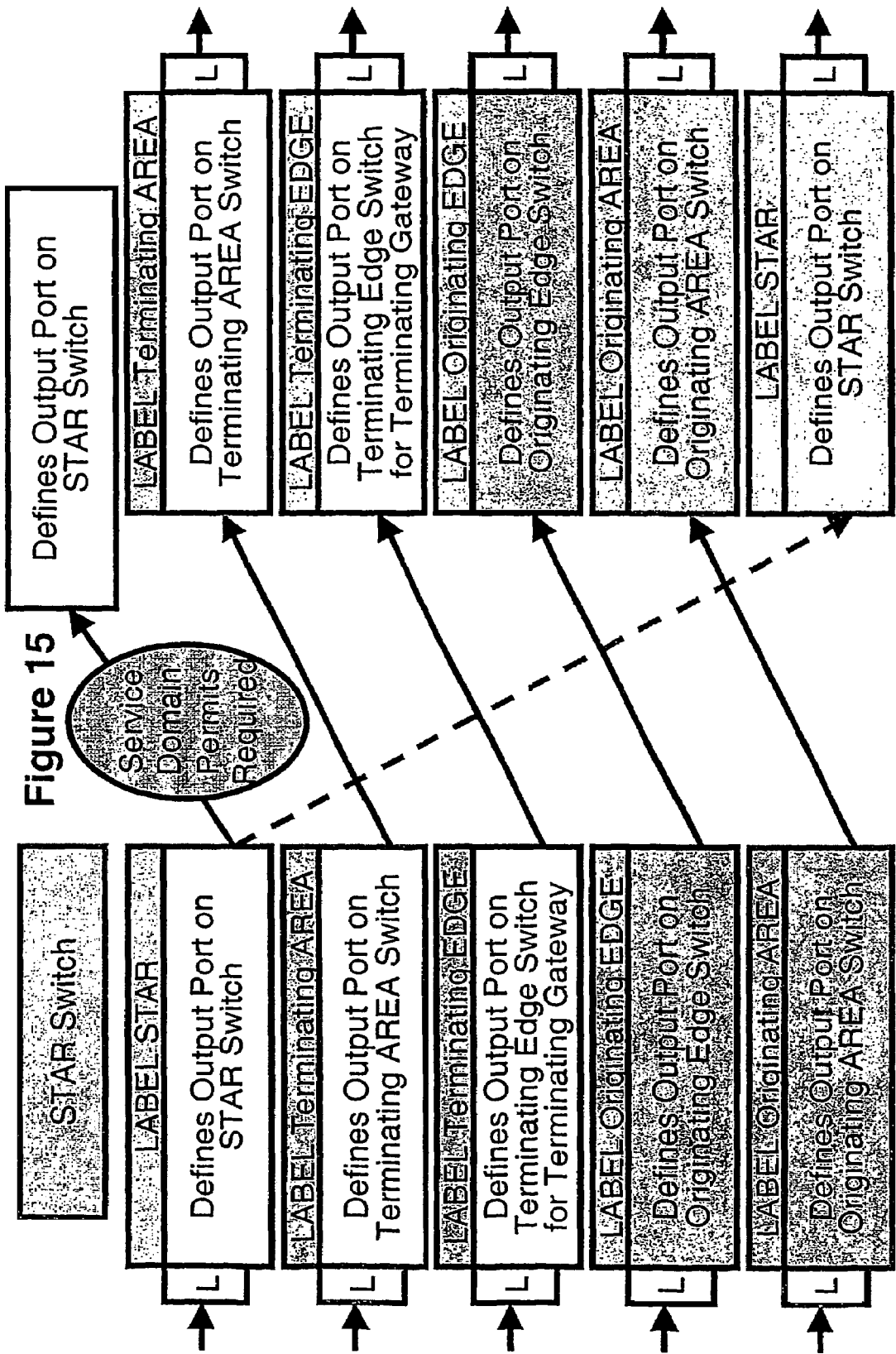
FIG. 15 shows a diagrammatic view illustrating the action of Relative Port Label Switching at an Originating STAR Node.

FIG. 15 shows the action required at the STAR Node Switch.

Figure 16:
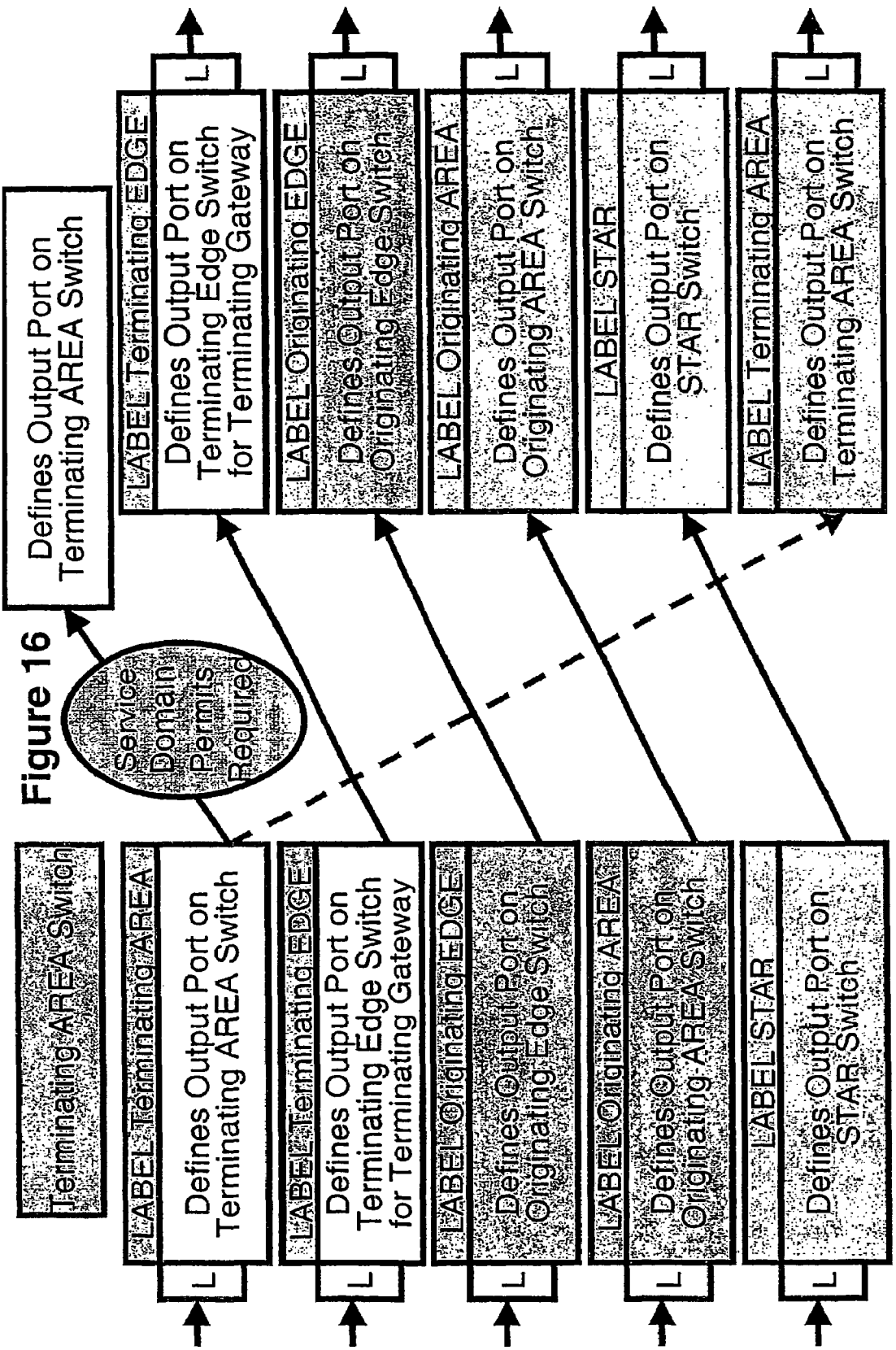
FIG. 16 shows a diagrammatic view illustrating the action of Relative Port Label Switching at an Terminating AREA Node.

FIG. 16 shows the action required at the Terminating AREA Node Switch.

Figure 17:
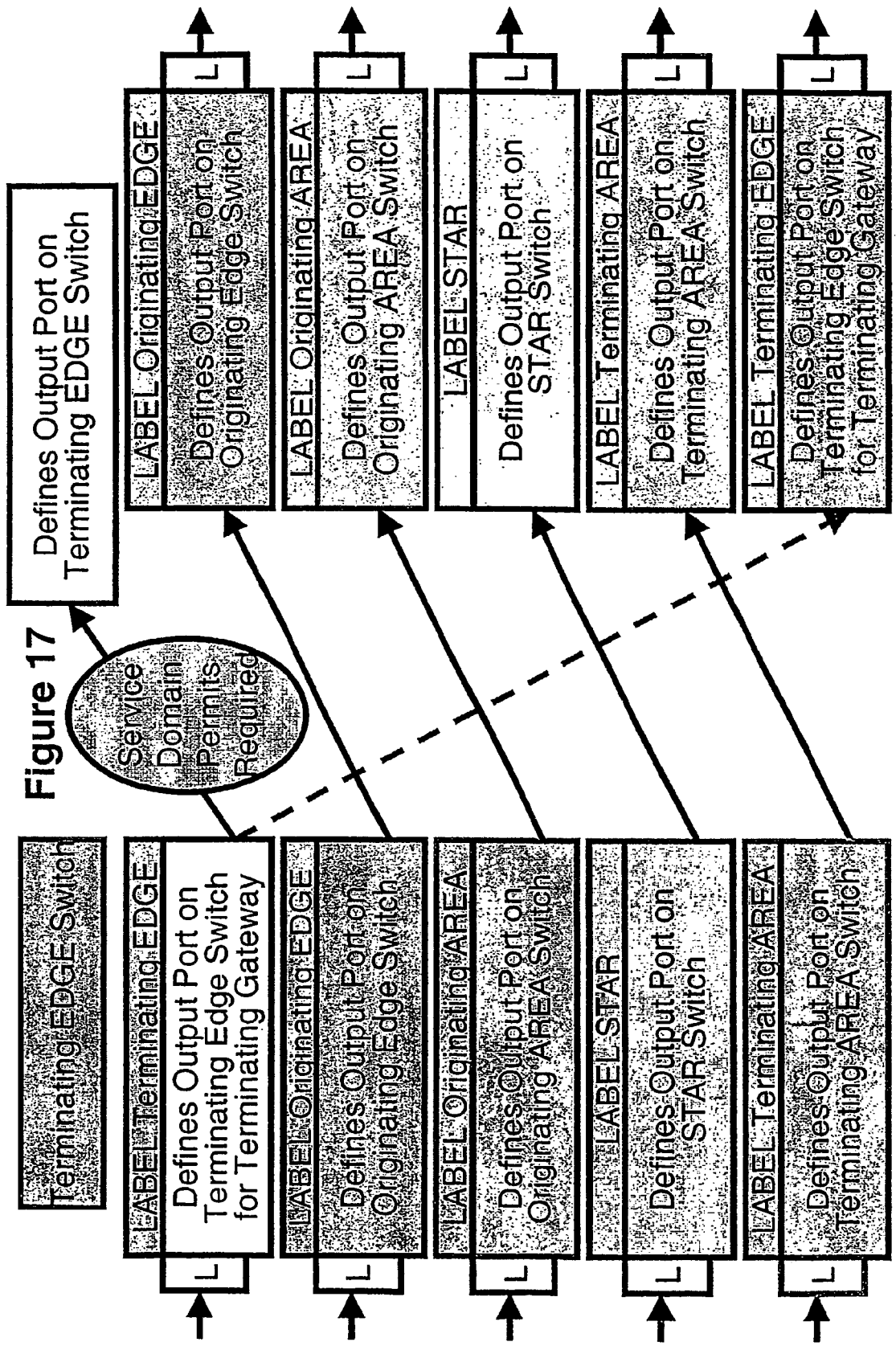
FIG. 17 shows a diagrammatic view illustrating the action of Relative Port Label Switching at an Terminating Allocated Edge Node.

FIG. 17 shows the action required at the Terminating AREA Node Switch

Figure 18:
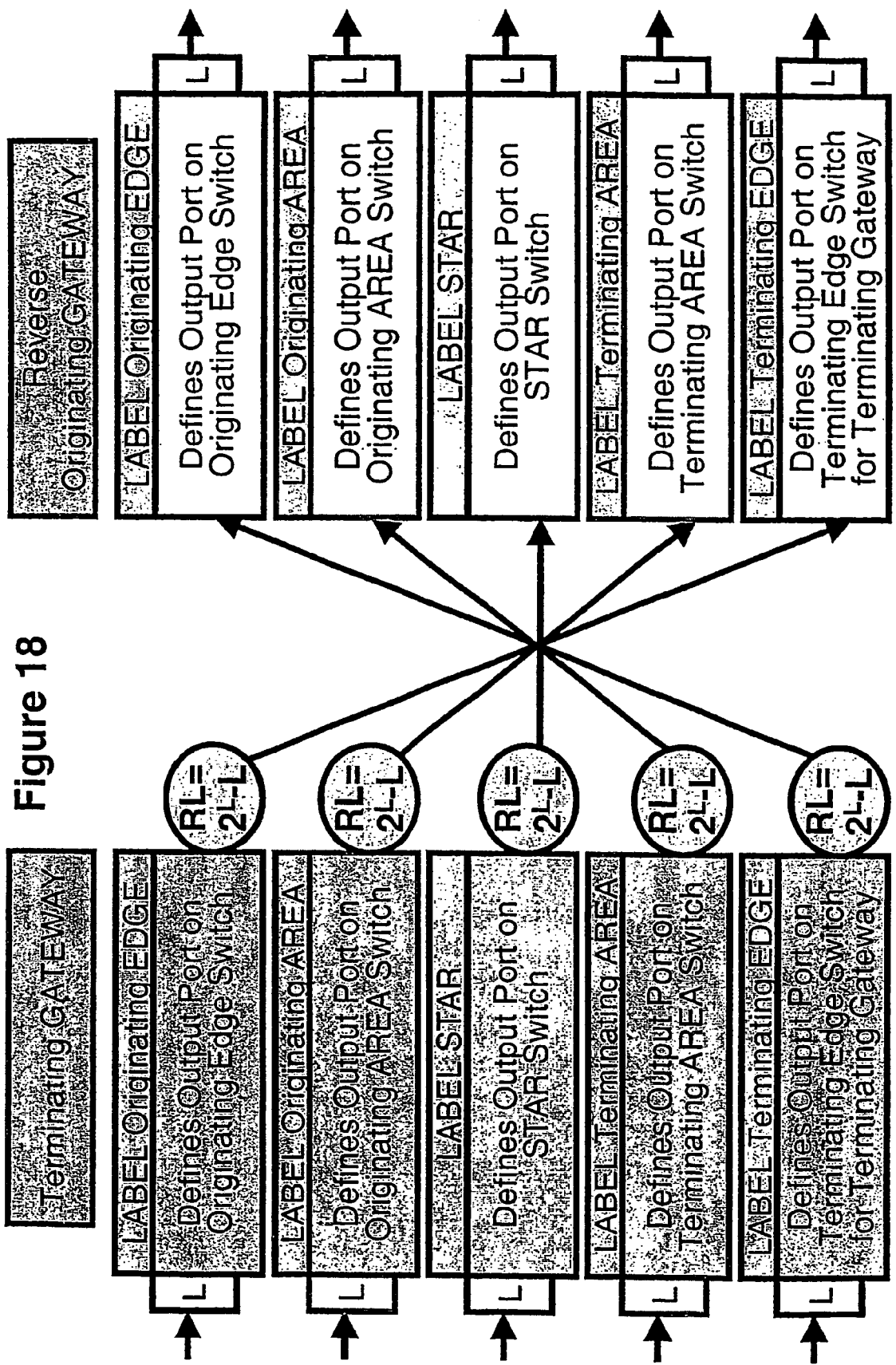
FIG. 18 shows a diagrammatic view illustrating the generation of a Reverse Stack of Relative Port Labels at a Gateway.

FIG. 18 shows the state of the labels that arrive at the terminating Gateway and how the Reverse Stack can be deduced.

It should be noted that the Capacity Allocation Parameters for each Service Domain Permit may be supplied to the Relative Port Label Switches via a management or a control interface. Some other information that may need to be supplied via a management control interface is: the Level assigned to each link; the type of Network e.g. STAR, FLAT (with Point Meshes), FLAT (without Point Meshes); the type of node and the format of the header.

In order to supply management information via the normal traffic interfaces it may be required to attach a Management Gateway to a port on a node in the network that does not normally have a directly connected gateway, e.g. a STAR Node. Management information received by a normal traffic interface would be switched (as indicated by the Significant Label) through to the port to which the Management Gateway is attached.

The present application has mentioned that once a label has been used it may be placed at the end of the stack. This helps to indicate, to the next switch which is the Significant Label. There are other ways of indicating which is the Significant Label, which involve making it clear which labels have been used and therefore the next one in the stack is the Significant one. This could be achieved by using individual indicators for each label, or by inverting the parity bit, or by incrementing a count value to say how many labels have been used. It is also possible in the case of a STAR Network to deduce, from the connection rules, which is the Significant Label although this is not the case for a FLAT network. The Significant Label can be deduced if some additional information is included with the Label Stacks used in a FLAT network, such as:

the numerical identity of one relevant node (not for 5 label stacks)

the numerical identity of more than one relevant nodes the numerical identity of one relevant node, provided nodes are aware of the numerical identities of nodes to which they are connected.

The advantage of not having to change the header can simplify the switch circuitry and may be of considerable benefit to some forms of switching, such as optical switching. Another benefit is that if a switch does not change the contents of a message (neither header nor payload) then finding faults and performance monitoring may be easier.

The invention claimed is:

1. A communications switch, comprising: a plurality of numerically identified input traffic ports at which messages enter the switch; a plurality of numerically identified output traffic ports at which messages leave the switch; at least one numerical processor; each message entering the switch by a numerically identified input traffic port containing a header which contains a label stack that includes at least one valid label which is a significant label; at least one significant label extraction means for extracting a numerical value of the significant label contained within the header of a particular one of the messages which entered the switch via a particular one of the numerically identified input traffic ports, and for supplying the extracted numerical value of the significant label to the at least one numerical processor operative for using the significant label of the particular one of the messages and a numerical value of the particular one of the numerically identified input traffic ports to form a numerical result which directly equates to a number of the numerically identified output traffic port by which said particular one of the messages leaves the switch.

2. The communications switch as claimed in claim 1, wherein a numerically identified input traffic port and a numerically identified output traffic port form a duplex pair having the same numerical identity.

3. The communications switch as claimed in claim 1, wherein the header contains multiple valid labels in the label stack, and wherein a first label in the stack received by the switch is the significant label.

4. The communications switch as claimed in claim 3, wherein once the numerical value of the significant label has been extracted, the significant label is moved to a last position in the stack.

5. The communications switch as claimed in claim 1, wherein the numerical result is equal to the numerical value of the significant label.

6. The communications switch as claimed in claim 1, wherein the numerical result is equal to a modulo addition of the numerical value of the significant label and the numerical value of the particular one of the numerically identified input traffic ports.

7. The communications switch as claimed in claim 6, and an interface for applying a set of connection rules, and wherein the messages are not forwarded from the switch unless the messages comply with the applied set of connection rules.

8. The communications switch as claimed in claim 7, wherein the header of the particular one of the messages includes a broadcast indicator, and wherein the particular one of the messages leaves the switch via all the numerically identified output traffic ports, except the numerically identified output traffic port which has the same number as the numerically identified input traffic port by which the particular one of the messages entered the switch.

9. The communications switch as claimed in claim 8, wherein each message leaving the switch has a used significant label set to the same numerical value as a similar message would have if the similar message had entered on the same numerically identified input traffic port and left on the same numerically identified output traffic port, except that the similar message does not include the broadcast indicator.

10. The communications switch as claimed in claim 1, and separate and additional gateways for generating the messages with label stacks, for receiving the messages, for generating broadcast messages, for receiving the broadcast messages, for generating broadcast response messages using a reverse label stack, and for receiving the broadcast messages containing a violation indicator.

11. The communications switch as claimed in claim 1, wherein the header of each message also includes a service domain permit number to indicate to which service domain a message belongs; and means for comparing a quantity of traffic from each service domain that is forwarded to a numerically identified output traffic port against capacity allocation parameters held for a respective service domain for the numerically identified output traffic port.

12. The communications switch as claimed in claim 11, wherein if a numerically identified output traffic port is affected by the capacity allocation parameters being exceeded, then a broadcast message containing a violation indicator is initiated in an opposite direction by the affected numerically identified output traffic port via the numerically identified input traffic port having the same numerical identity.

13. A partially interconnected network, comprising: a plurality of communications switches connected to form the network, each switch as claimed in claim 1, the plurality of switches being allocated nodes or star nodes, each allocated node being allocated to one of a number of areas, a plurality of point-to-point interconnections between the allocated nodes and the star nodes, wherein a number of areas with allocated nodes interconnected to an individual star node forms a number of routes from an individual star node, the allocated nodes of a first of the areas being interconnected to a set comprising some, but not all, of the star nodes, and wherein further of the areas are similarly interconnected to further sets each comprising star nodes, and where there is at least one interconnection choice between any two allocated nodes in different areas.

14. The network as claimed in claim 13, wherein the plurality of switches represent at least six topological nodes; wherein a topological node is a single physical node, or a group of interconnected physical nodes, or part of a physical node, or part of a group of interconnected physical nodes, or parts of physical nodes; each topological node having at least three point-to-point topological links connecting it to some, but not all, of the plurality of topological nodes; and where there is at least one choice of routing between any two topological nodes, and where the at least one choice of routing comprises either two point-to-point topological links connected in series at another of the topological nodes, or a direct point-to-point topological link between the two topological nodes.

15. The network as claimed in claim 13, wherein the plurality of switches represent a plurality of nodes, wherein at least one of the plurality of nodes includes a switching means for carrying out a simple transit core function, and wherein three or more of the plurality of nodes include a single link interface having associated output attributes and/or input cognizant attributes, wherein each simple transit core function at one node is not logically connected to another simple transit core function at another node, wherein each simple transit core function at one node is logically connected to at least three single link interfaces at other nodes, and wherein the nodes including single link interfaces which are connected to one instance of a node arranged to carry out a simple transit core function are controlled by respective intercommunicating connection acceptance control processes according to the respective output attributes and/or input cognizant attributes.

\* \* \* \* \*